United States Patent
Song et al.

(10) Patent No.: US 8,107,958 B2
(45) Date of Patent: Jan. 31, 2012

(54) METHOD OF UPDATING CHANNEL INFORMATION IN MOBILE INTERNET SYSTEM, AND MOBILE COMMUNICATION TERMINAL AND MOBILE INTERNET SYSTEM USING THE SAME

(75) Inventors: Ki Taek Song, Seoul (KR); Sung Hun Hong, Seoul (KR); Seong Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 681 days.

(21) Appl. No.: 11/716,565

(22) Filed: Mar. 12, 2007

(65) Prior Publication Data

US 2008/0119186 A1    May 22, 2008

(30) Foreign Application Priority Data

Nov. 22, 2006   (KR) .......................... 10-2006-0115729

(51) Int. Cl.
  *H04W 36/00*    (2009.01)
(52) U.S. Cl. ...................... 455/436; 455/422.1; 455/434; 455/437; 455/450; 455/452.2; 370/328; 370/329; 370/331; 370/332
(58) Field of Classification Search .................. 370/311, 370/328–337; 455/436–444, 434
See application file for complete search history.

(56) References Cited

U.S. PATENT DOCUMENTS

| | | | | |
|---|---|---|---|---|
| 5,499,386 | A * | 3/1996 | Karlsson .......................... | 455/444 |
| 2001/0055969 | A1* | 12/2001 | Bonta et al. .................... | 455/436 |
| 2004/0174845 | A1* | 9/2004 | Koo et al. ...................... | 370/328 |
| 2006/0268756 | A1* | 11/2006 | Wang et al. ..................... | 370/310 |
| 2007/0105558 | A1* | 5/2007 | Suh et al. ........................ | 455/436 |
| 2008/0113670 | A1* | 5/2008 | Dufour et al. .................. | 455/436 |

FOREIGN PATENT DOCUMENTS

| | | | |
|---|---|---|---|
| KR | 10-2005-0107667 A | 11/2005 | |
| KR | 10-2005-0079103 A | 7/2006 | |

* cited by examiner

*Primary Examiner* — Kamran Afshar
*Assistant Examiner* — Neda Behrooz
(74) *Attorney, Agent, or Firm* — Birch, Stewart, Kolasch & Birch, LLP

(57) ABSTRACT

A method of updating channel information in a mobile Internet system, and a mobile communication terminal and mobile Internet system using the same are disclosed. According to an embodiment, the method of updating channel information in a mobile Internet system includes receiving, by a mobile communication terminal, a handover related message including channel information of at least one handover base station from a serving base station; and selectively updating the channel information of the at least one handover base station in the mobile communication terminal by using the received handover related message. Accordingly, it is possible to minimize mismatching of channel information of a target base station when performing a handover.

13 Claims, 7 Drawing Sheets

FIG. 5

| Syntax | Size (bits) | Notes |
|---|---|---|
| MOB_BSHO-RSP_Message_format() { | | |
| Management Message Type = 58 | 8 | |
| Mode | 3 | |
| Reserved | 5 | Shall be set to zero |
| If(Mode==0b000) { | | |
| HO operation mode | 1 | |
| N_Recommended | 8 | |
| Resource Retain Flag | 1 | |
| Reserved | 7 | Shall be set to zero |
| For(j=0; j<N_Recommended; j++) { | | |
| Neighbor BSID | 48 | |
| Preamble index/Preamble Present & Subchannel Index | 8 | |
| Service level prediction | 8 | |
| HO process optimization | 8 | |
| Network Assisted HO supported | 1 | |
| HO_ID_included_indicator | 1 | Indicates if the field HO_IND is included |
| If(HO_ID_included_indicator=1) { | | |
| HO_ID | 8 | |
| HO_authorization policy indicator | 1 | |
| DCD Configuration Change Count | 4 | |
| UCD Configuration Change Count | 4 | |
| padding | variable | Padding bits to ensure byte aligned |
| TLV encoded information | variable | TLV specific |
| } | | |

501 — DCD Configuration Change Count
503 — UCD Configuration Change Count
505 — TLV encoded information

FIG. 8

| Syntax | Size (bits) | Notes |
|---|---|---|
| MOB_BSHO-REQ_Message_format() { | | |
|   Management Message Type = 56 | 8 | |
|   Network Assisted HO supported | 1 | |
|   Mode | 3 | |
|   padding | 4 | Shall be set to zero. |
|   If(Mode==0b000) { | | |
|     HO operation mode | 1 | |
|     N_Recommended | 8 | |
|     Resource Retain Flag | 1 | |
|     padding | 6 | Shall be set to zero. |
|     For(j=0; j<N_Recommended; j++) { | | |
|       Neighbor BSID | 48 | |
|       Service level prediction | 8 | |
|       Preamble index/Subchannel Index | 8 | |
|       HO process optimization | 8 | |
|       Network Assisted HO supported | 1 | |
|       HO_ID_included_indicator | 1 | |
|       DCD Configuration Change Count | 4 | |
|       UCD configuration Change Count | 4 | |
|       HO_authorization policy indicator | 1 | |
| ... | | |
|   padding | variable | Padding bits to ensure byte aligned |
|   TLV encoded information | variable | TLV specific |
| } | | |

801 — DCD Configuration Change Count
803 — UCD configuration Change Count
805 — TLV encoded information

METHOD OF UPDATING CHANNEL INFORMATION IN MOBILE INTERNET SYSTEM, AND MOBILE COMMUNICATION TERMINAL AND MOBILE INTERNET SYSTEM USING THE SAME

This application claims the priority benefit of Korean Patent Application No. 10-2006-0115729, filed on Nov. 22, 2006, which is hereby incorporated by reference as if fully set forth herein.

BACKGROUND OF THE INVENTION

1. Field of the Invention

The present invention relates to a mobile Internet system, and more particularly, to a method of updating channel information in a mobile Internet system, and to a mobile communication terminal and mobile Internet system using the same.

2. Discussion of the Related Art

A mobile communication terminal according to the related art periodically receives a network management message including channel information of neighbor base stations from a base station (hereinafter, referred to as a serving base station), which currently transmits/receives data and is communicating with the mobile communication terminal.

When a handover to a target base station is performed by handover negotiation with the serving base station, the mobile communication terminal receives channel information of the target base station from the target base station. The mobile communication terminal determines whether the channel information of the target base station extracted from the channel information of the neighbor base stations matches the channel information of the target base station received from the target base station.

If it is determined that the channel information matches, the mobile communication terminal continues to perform the handover to the target base station.

On the other hand, if it is determined that the channel information does not match, the mobile communication terminal determines whether the handover is cancelled, a handover to another target base station is performed, or the mobile communication terminal waits for another channel information message to be received from the target base station.

However, in the related art, the channel information of the target base station, which is included in the network management message received from the serving base station, often does not match the channel information of the target base station received from the target base station during the handover. This is because a transmission period of the network management message is remarkably larger than an update period of the channel information of the neighbor base stations, and thus current channel information of the neighbor base stations may not be included in the network management message.

Accordingly, the channel information of the target base station is frequently mismatched during the handover, and thus the handover may be delayed or cancelled.

BRIEF SUMMARY OF THE INVENTION

Accordingly, the present invention is directed to a method of updating channel information in a mobile Internet system, and a mobile communication terminal and a mobile Internet system using the same that substantially obviate one or more problems due to limitations and disadvantages of the related art.

An object of the present invention is to provide a method of updating channel information of a target base station during a handover negotiation and to provide a mobile communication terminal using the same.

Another object of the present invention is to provide a method of requesting channel information to be transmitted and receiving the channel information using a message (e.g., a handover request message or a handover response message) transmitted/received during a handover negotiation, and to provide a mobile communication terminal using the same.

Another object of the present invention is to provide a method and device for transmitting channel information of at least one handover base station from a serving base station to a mobile communication terminal through a handover related message such as a handover request message or a handover response message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of updating channel information in a mobile Internet system according to an aspect of the present invention comprises: receiving, by a mobile communication terminal, a handover related message including channel information of at least one handover base station from a serving base station; and selectively updating the channel information of the at least one handover base station in the mobile communication terminal by using the received handover related message.

In another aspect of the present invention, there is provided a method of transmitting channel information in a mobile Internet system, comprising: collecting, by a serving base station, channel information of neighbor base stations; and transmitting, by the serving base station, a handover related message including channel information of at least one handover base station in the collected channel information to a mobile communication terminal.

In another aspect of the present invention, there is provided a mobile communication terminal for updating channel information in a mobile Internet system, comprising: a transceiver configured to receive a handover related message including channel information of at least one handover base station from a serving base station; a memory configured to store channel information of at least one neighbor base; and a controller configured to selectively update channel information of at least one handover base station by using the received handover related message.

In another aspect of the present invention, there is provided a mobile Internet system for updating channel information, comprising: a serving base station for collecting channel information of neighbor base stations and transmitting a handover related message including channel information of at least one handover base station in the collected channel information to a mobile communication terminal; and the mobile communication terminal for determining whether the channel information included in the received handover related message matches previously stored channel information and selectively updating the channel information of the at least one handover base station based on the determination result.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a view showing an example of the structure of a message including the channel information according to the first embodiment of the present invention;

FIG. 8 is a view showing an example of the structure of a message including the channel information according to the second embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. In describing the present invention, if it is determined that the detailed description of a related known function or construction renders the scope of the present invention unnecessarily ambiguous, the detailed description thereof will be omitted.

A mobile Internet system to which the present invention is applicable is preferably a mobile Internet system based on IEEE 802.16 standard or IEEE 802.20 standard. For example, representative examples of the mobile Internet system can be, but are not limited to, wireless broadband (WiBRO) and WiMAX based on IEEE 802.16(e). In addition, the present invention is applicable to all wireless mobile Internet systems having mobility. Also the present invention is not limited to a mobile Internet system, but can be applied to a mobile network system using other networks.

Figure 1:
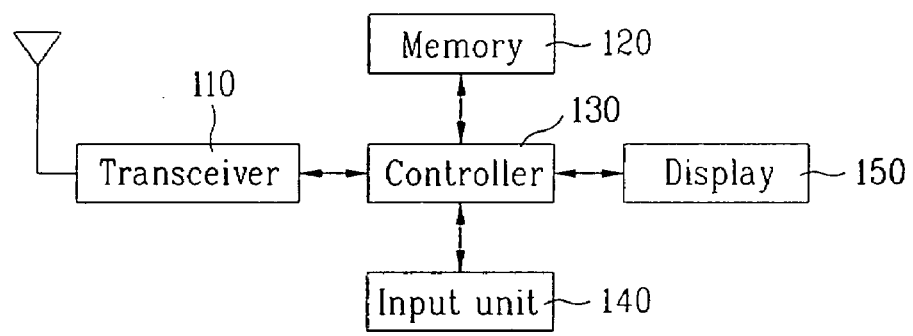
FIG. 1 is a block diagram showing an embodiment of a mobile communication terminal for updating channel information according to the present invention.
Figure 2:
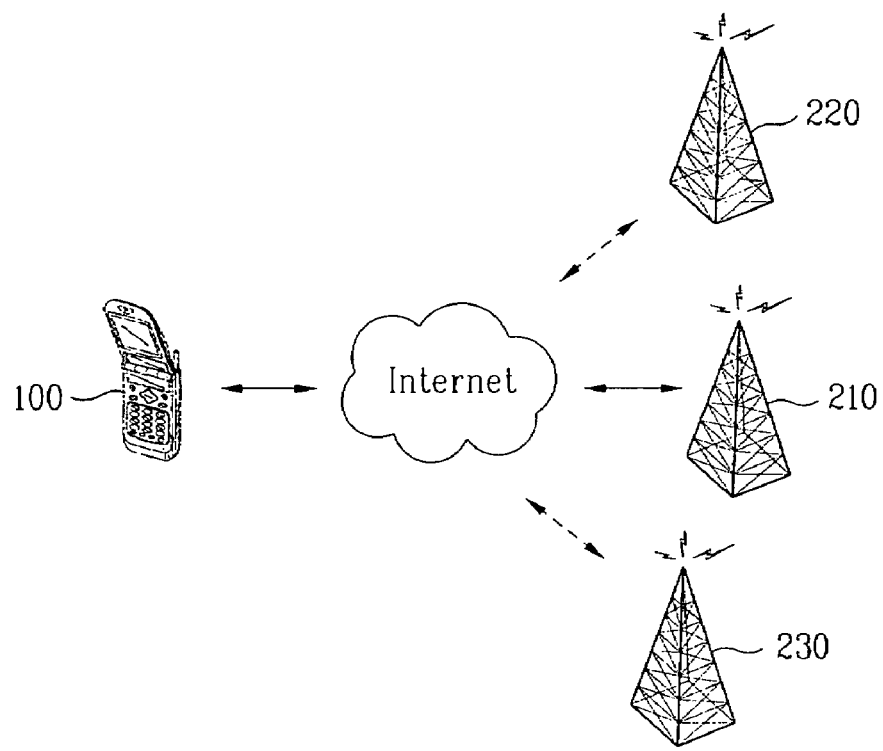
FIG. 2 is a view showing the structure of an embodiment of a mobile Internet system for updating channel information according to the present invention.

A mobile communication terminal for updating channel information in a mobile Internet system according to the present invention will be described in detail with reference to FIGS. 1 and 2. FIG. 1 is a block diagram showing an example of a mobile communication terminal 100 for updating channel information according to an embodiment of the present invention. FIG. 2 is a view showing an example of a mobile Internet system including the mobile communication terminal 100 for updating channel information according to an embodiment of the present invention.

As shown in FIGS. 1 and 2, the mobile communication terminal 100 includes a transceiver 110 configured to transmit/receive data to/from a serving base station 210 over the Internet or other network, a memory 120 configured to store all data input/output to/from the mobile communication terminal 100 and operating program(s), a controller 130 configured to control the operations of the mobile communication terminal 100, an input unit 140 configured to generate signal(s) corresponding to an input operation of a user, and a display 150 (e.g., one or more LCD screens) configured to display information on the mobile communication terminal 100. The mobile communication terminal 100 can include other components such as a speaker, a camera, etc., can be a cell phone, a PDA, a smart phone, a laptop, etc. The serving base station 210 is a base station currently serving and communicating with the mobile communication terminal 100. The system includes a plurality of neighbor base stations 220, 230. In FIG. 2, three base stations are shown only as an example, and the invention is not limited thereto.

Hereinafter, the operations of the above-described components of the mobile communication terminal 100 will be described in detail.

The transceiver 110 receives a network management message including channel information of the neighbor base stations 220 and 230 from the serving base station 210.

The channel information, for example, includes at least one of downlink channel information and uplink channel information. The downlink channel indicates a channel for allowing the mobile communication terminal 100 to receive data from any base station, and the uplink channel indicates a channel for allowing the mobile communication terminal 100 to transmit data to any base station.

The network management message is obtained by allowing the serving base station 210 to collect information on the neighbor base stations 220 and 230 from the neighbor base stations 220 and 230 and to transmit the collected information to the mobile communication terminal 100. Accordingly, the network management message includes the channel information of the neighbor base stations 220 and 230. In particular, the network management message may be a neighbor advertisement (MOB_NBR-ADV) message defined in IEEE 802.16 standard.

Generally, the MOB_NBR-ADV message provides a count value to the mobile communication terminal 100 as identification information for identifying the current channel information, via a downlink channel descriptor (DCD) configuration change count field or an uplink channel descriptor (UCD) configuration change count field, when the channel information of each neighbor base station is changed.

The MOB_NBR-ADV message provides the channel information of each neighbor base station to the mobile communication terminal 100 via a DCD_settings field or an UCD_settings field. In particular, the MOB_NBR-ADV message provides the channel information via the DCD_settings field or the UCD_settings field, only with respect to the neighbor base station having the channel information different from that of the serving base station 210. The received channel information of the neighbor base stations is stored in the memory 120 or other suitable storage unit.

Since the mobile communication terminal 100 periodically receives the MOB_NBR-ADV message from the serving base station 210, the channel information of the neighbor base stations 220, 230 may be periodically updated. However, in the related art, a reception period of a MOB_NBR-ADV message is at most 30 seconds, which is larger than an update period of the channel information of the neighbor base stations in the serving base station. Accordingly, the channel information provided by the MOB_NBR-ADV message frequently does not include the current channel state of the neighbor base stations.

Accordingly, in the present invention, the channel information of the neighbor base stations 220 and 230, and more particularly a handover base station, is rapidly provided to the mobile communication terminal 100 such that the mismatching of the channel information of the target base station is minimized upon a handover.

The memory 120 stores information included in the network management message received by the transceiver 110 from the serving base station 210. In particular, the memory 120 stores the channel information of the neighbor base stations 220 and 230 contained in the received network management message.

The transceiver 110 transmits a handover request message to the serving base station 210 and receives a handover response message including the channel information of at least one handover base station in response to the handover request message. The handover base station refers to a neighbor base station (e.g., one of the neighbor stations 220 and 230, in this example) to which the serving base station 210 recommends the mobile communication terminal to perform the handover. That is, the handover base station is a neighbor base station that the serving base stations 210 designates or recommends for the handover, and channel information of the handover base station is contained in the handover response message sent from the serving base station 210 to the mobile communication terminal 100 according to an embodiment.

For instance, the mobile communication terminal 100 may request the serving base station 210 to transmit channel information of at least one handover base station, which is selected by the mobile communication terminal 100, using the handover request message. Then the serving base station 210 sends the requested channel information as part of the handover response message to the mobile communication terminal 100. The handover request message may be a MOB_M-SHO-REQ message defined in IEEE 802.16 standard and the handover response message may be a MOB_BSHO-RSP message defined IEE 802.16 standard.

In another example, the mobile communication terminal 100 receives a handover request message including channel information of at least one handover base station recommended by the serving base station 210 from the serving base station 210. The handover request message may be a MOB_BSHO-REQ message defined in IEEE 802.16 standard.

The controller 130 extracts the channel information of the handover base station from the channel information of the neighbor base stations 220 and 230 (obtained from the network management message) which is stored in the memory 120. The controller 130 then determines whether the channel information of the handover base station included in the handover response message or the handover request message matches the extracted channel information of the handover base station (obtained from the network management message).

The channel information of the handover base station includes at least one of the downlink channel information of each base station, the uplink channel information of each base station, and the identification information for identifying the channel information. In particular, as an example, the identification information is a DCD configuration change count (hereinafter, also referred to as a "DCD count value") or an UCD configuration change count (hereinafter, also referred to as an "UCD count value") in IEEE 802.16 standard.

Accordingly, the controller 130 determines the matching of the channel information by comparison of the identification information of the channel information, and more particularly the DCD count value or the UCD count value.

If it is determined that the channel information does not match, the controller 130 updates the previously stored channel information of the handover base station as stored in the memory 120 with the channel information of the handover base station included in the handover response message or the handover request message. That is, the memory 120 is updated to include the most current channel information of the handover base station obtained from the handover response message or handover request message.

If it is determined that the channel information matches, the controller 130 maintains the channel information of the handover base station which is previously stored in the memory 120, without alteration.

Figure 3:
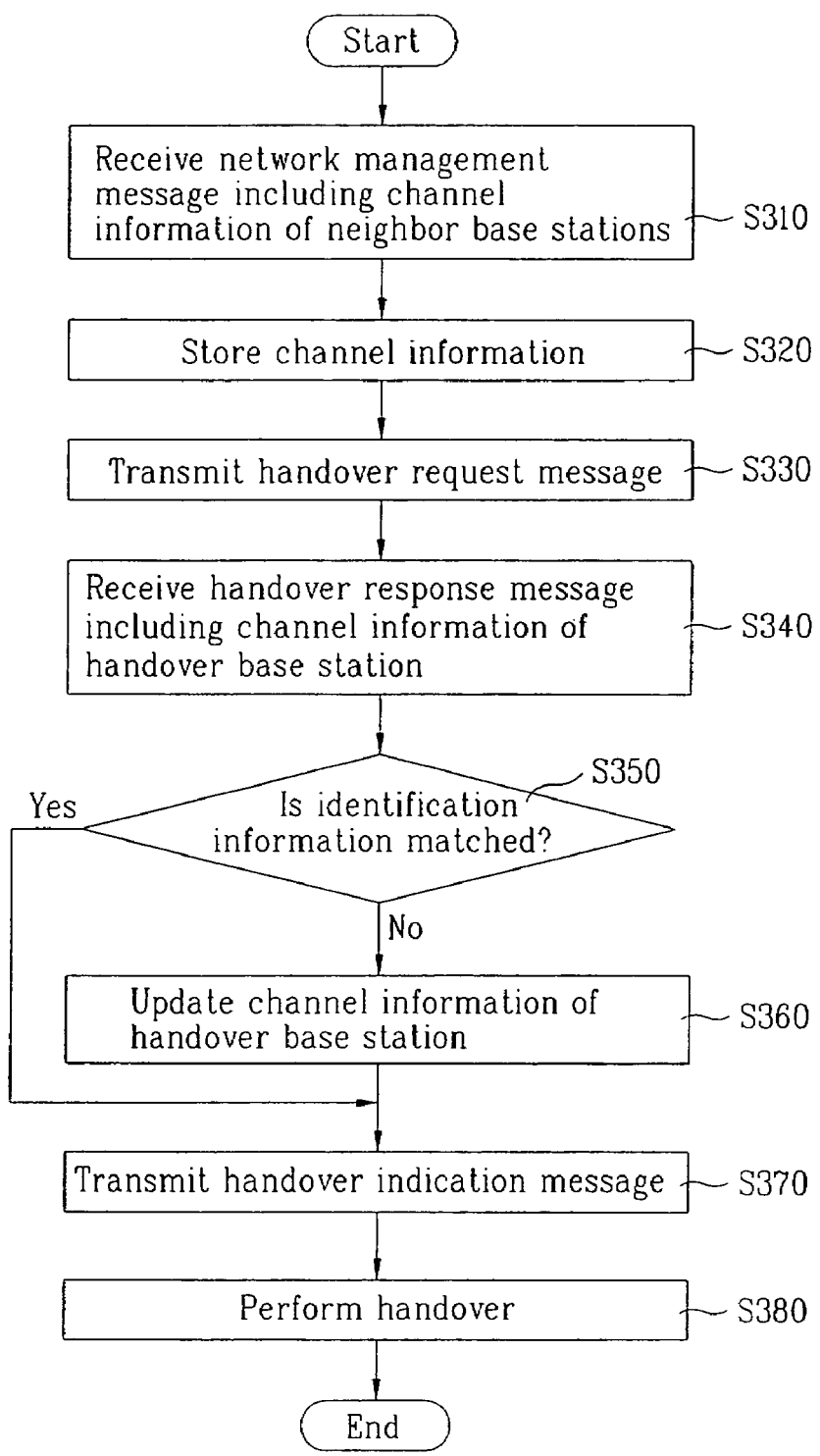
FIG. 3 is a flowchart schematically illustrating a method of updating channel information according to a first embodiment of the present invention.
Figure 4:
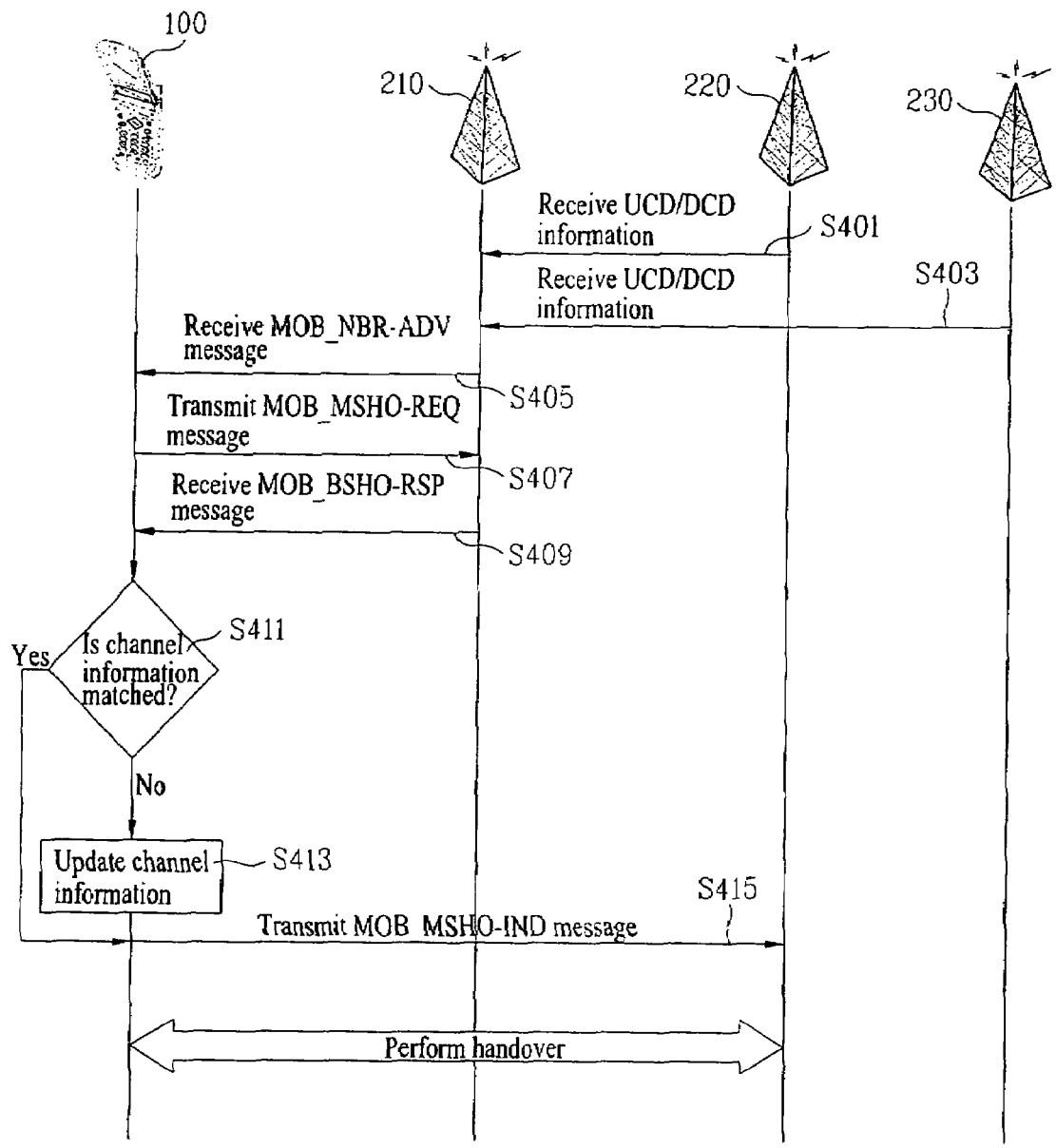
FIG. 4 is a signal flowchart illustrating the method of updating the channel information according to the first embodiment of the present invention.

A method of updating channel information according to a first embodiment of the present invention will be described in detail with reference to FIGS. 2, 3 and 4. In particular, FIG. 4 shows a method of transmitting/receiving a message and updating channel information based on IEEE 802.16 standard. The method here, however, can be applied to other suitable device or system.

The mobile communication terminal 100 receives a network management message including the channel information of the neighbor base stations 220 and 230 from the serving base station 210 (S310). Here, the channel information, for example, includes at least one of the downlink channel information and the uplink channel information.

In particular, as shown in FIG. 4, the serving base station 210 receives the respective channel information, that is, the UCD/DCD information, from each of the first neighbor base station 220 and the second neighbor base station 230 (S401 and S403). The serving base station 210 generates a MOB_NBR-ADV message including the channel information (e.g., the UCD/DCD information) of the neighbor base stations 220 and 230. The mobile communication terminal 100 receives the MOB_NBR-ADV message including the channel information of the neighbor base stations 220 and 230 from the serving base station 210 (S405). The MOB_NBR-ADV message is described above and thus the detailed description thereof will be omitted herein.

The mobile communication terminal 100 extracts and stores the channel information of the neighbor base stations 220 and 230 included in the network management message (S320). The extracted channel information can be stored in the memory 120 of the mobile communication terminal 100.

Meanwhile, the mobile communication terminal 100 transmits a handover request message to the serving base station 210 (S330) and receives a handover response message including channel information of at least one handover base station (which the serving base station 210 recommends for this handover) in response to the handover request message (S340). At this time, the mobile communication terminal 100 may request the serving base station 210 to transmit the channel information of at least one handover base station, which is selected by the mobile communication terminal 100, using the handover request message.

For instance, as shown in FIG. 4, the mobile communication terminal 100 transmits a MOB_MSHO-REQ message to the serving base station 210 (S407) and receives a MOB_B-

SHO-RSP message including the channel information of the at least one handover base station in response to the MOB_M-SHO-REQ message (S409).

The channel information of the handover base station included in the MOB_BSHO-RSP message in step S409 will now be described with reference to FIG. 5.

The serving base station 210 provides the mobile communication terminal 100 with the count value which is the identification information for identifying the current channel information of the at least one handover base station, via a DCD configuration change count field 501 or an UCD configuration change count field 503 of the MOB_BSHO-RSP message. The DCD configuration change count field 501 or the UCD configuration change count field 503 may be set using a reserved field of the MOB_BSHO-RSP message, and can include the DCD count value or UCD count value (channel information) of the handover base station.

The serving base station 210 sets the DCD_settings field or the UCD settings field in a TLV encoded information field 505 of the MOB_BSHO-RSP message, and provides the channel information of one or more handover base station(s) to the mobile communication terminal 100 via the DCD_settings field or the UCD_settings field. According to an embodiment, the DCD_settings field or the UCD_setting field is encoded in the TLV encoded information field 505 in a TLV format, and may include the channel information of the handover base station.

The mobile communication terminal 100 extracts the channel information of the handover base station from the previously stored channel information of the neighbor base stations 220 and 230 (which was obtained by the network management message) and determines whether the extracted channel information of the handover base station matches the channel information of the handover base station included in the handover response message (S350 and S411).

In particular, the mobile communication terminal 100 may determine the matching of the channel information by comparison of the identification information of the channel information, and more particularly the DCD count value or the UCD count value. For instance, the mobile communication terminal 100 compares the DCD or UCD count value obtained from the network management message (e.g., in step S405) with the DCD or UCD count value obtained from the handover response message (e.g., in step S409), and determines whether or not the two pieces of the channel information match each other based on the comparison result.

If it is determined that the channel information does not match (e.g., the DCD or UCD count values do not match), the mobile communication terminal 100 updates the channel information of the at least one handover base station as stored in the memory 120 with the channel information of the at least one handover base station included in the handover response message (e.g., the MOB_BSHO-RSP message) (S360 and S413).

Then the mobile communication terminal 100 transmits a handover indication message (e.g., a MOB_MSHO-IND message) to the serving base station 210 (S370 and S415) and continues to perform the handover (S380).

Figure 6:
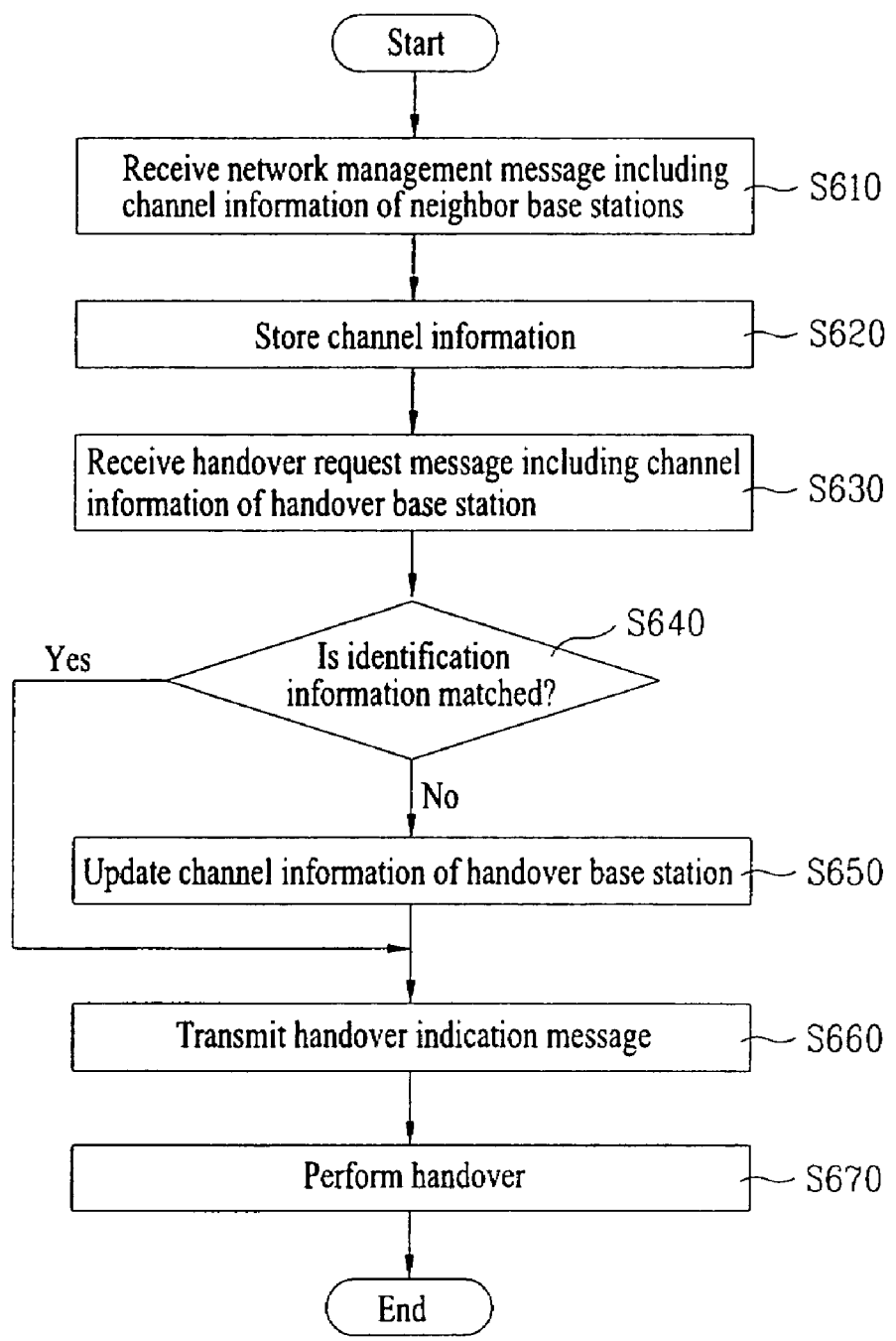
FIG. 6 is a flowchart schematically illustrating a method of updating channel information according to a second embodiment of the present invention.
Figure 7:
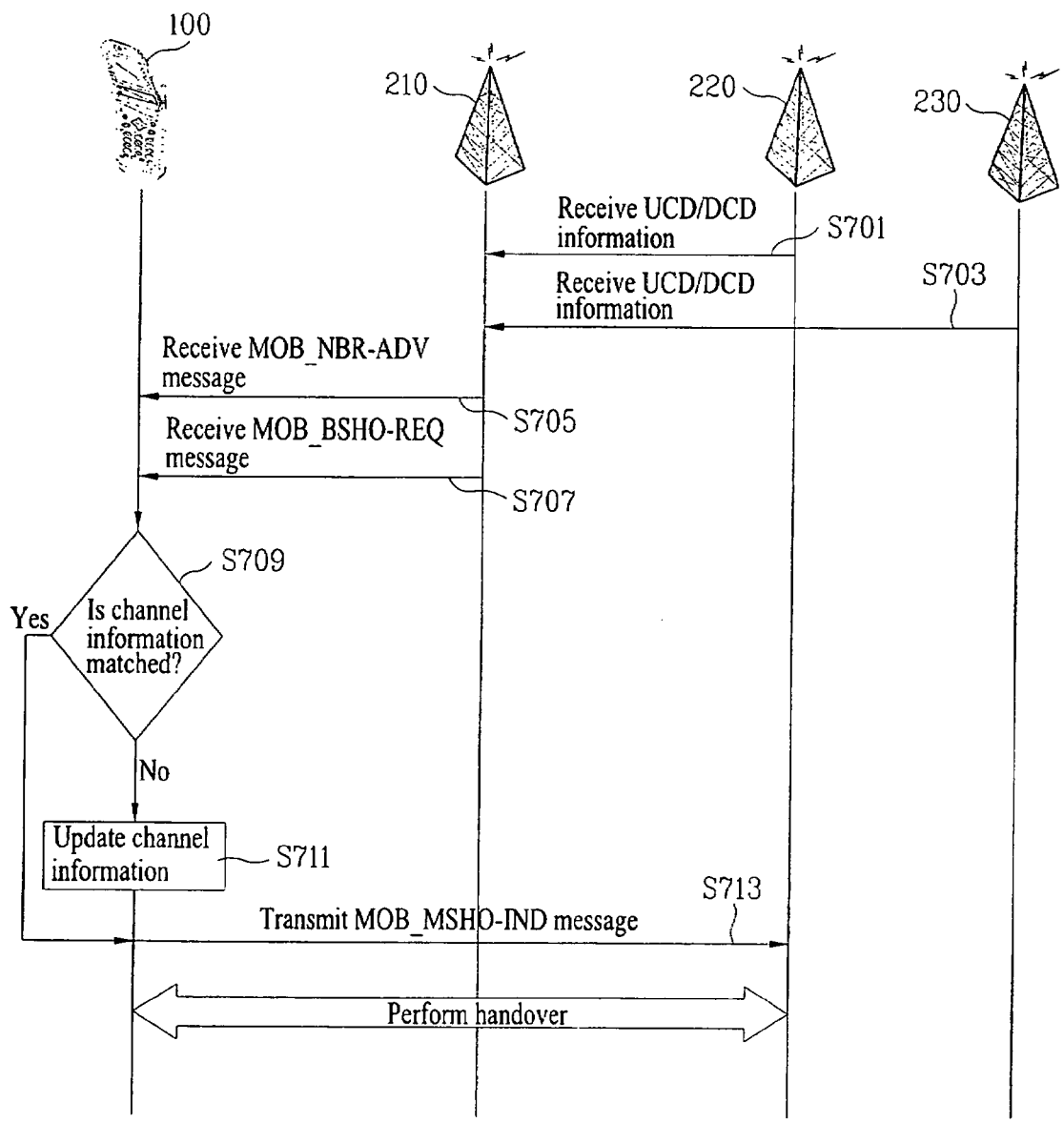
FIG. 7 is a signal flowchart illustrating the method of updating the channel information according to the second embodiment of the present invention.

A method of updating channel information according to a second embodiment of the present invention will now be described in detail with reference to FIGS. 2, 6 and 7. In particular, FIG. 7 shows a method of transmitting/receiving a message and updating channel information based on IEEE 802.16 standard. The method here, however, can be applied to other suitable device or system.

The mobile communication terminal 100 receives a network management message including channel information of the neighbor base stations 220 and 230 from the serving base station 210 (S610).

For instance, as shown in FIG. 7, the serving base station 210 receives the respective channel information, e.g., the UCD/DCD information, from the first neighbor base station 220 and the second neighbor base station 230 (S701 and S703). The serving base station 210 generates a MOB_NBR-ADV message including the channel information of the neighbor base stations 220 and 230 based on the received UCD/DCD information, and transmits it to the mobile communication terminal 100. The mobile communication terminal 100 receives the MOB_NBR-ADV message including the channel information of the neighbor base stations 220 and 230 from the serving base station 210 (S705). The MOB_NBR-ADV message is described above and thus the detailed description thereof will be omitted herein.

The mobile communication terminal 100 extracts and stores the channel information of the neighbor base stations 220 and 230 included in the network management message (S620). Here, the extracted channel information can be stored in the memory 120 of the mobile terminal communication 100.

Meanwhile, the mobile communication terminal 100 receives a handover request message including channel information of at least one handover base station from the serving base station 210 (S630). For instance, as shown in FIG. 7, the mobile communication terminal 100 receives a MOB_B-SHO-REQ message including the channel information of the at least one handover base station from the serving base station 210 (S707).

The channel information of the handover base station included in the MOB_BSHO-REQ message in step S707 will now be described with reference to FIG. 8.

The serving base station 210 provides the mobile communication terminal 100 with the count value which is the identification information for identifying the current channel information of the handover base station, via a DCD configuration change count field 801 or an UCD configuration change count field 803 of the MOB_BSHO-REQ message. According to an embodiment, the DCD configuration change count field 801 or the UCD configuration change count field 803 may be set using a reserved field of the MOB_BSHO-REQ message, and can include the DCD count value or UCD count value (channel information) of the handover base station.

The serving base station 210 sets the DCD_settings field or the UCD_settings field in a TLV encoded information field 805 of the MOB_BSHO-REQ message and provides the channel information of the handover base station to the mobile communication terminal 100 via the DCD_settings field or the UCD_settings field according to an embodiment.

The mobile communication terminal 100 extracts the channel information of the handover base station from the previously stored channel information of the neighbor base stations 220 and 230 (obtained from the network management message in step S620) and determines whether the extracted channel information of the handover base station matches the channel information of the handover base station included in the handover request message, e.g., the MOB_BSHO-REQ message (S640 and S709).

In particular, the mobile communication terminal 100 may determine the matching of the channel information by comparison of the identification information of the channel information, e.g., by comparing the DCD count values with each other or the UCD count values with each other.

If it is determined that the channel information does not match, the mobile communication terminal 100 updates the previously stored channel information of the handover base station with the channel information of the handover base station included in the handover request message (e.g., the MOB_BSHO-REQ message) (S650 and S711).

The mobile communication terminal 100 transmits a handover indication message such as the MOB_MSHO-IND message, to the serving base station 210 (S660 and S713) and continues to perform the handover (S670).

Accordingly, the present invention provides channel information of a handover base station using a handover request message or a handover response message during handover negotiation. As a result, it is possible for a terminal to rapidly obtain and update the channel information of the handover base station before performing a handover.

Furthermore, according to the present invention, since the channel information of the handover base station can be rapidly received, it is possible to minimize the mismatching of the channel information of a target base station when performing the handover. Accordingly, it is possible to rapidly perform the handover to the target base station.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of updating channel information in a mobile Internet system, the method comprising:
   receiving, from a serving base station by a mobile communication terminal, a network management message including channel information of plural neighbor base stations;
   transmitting, by the mobile communication terminal to the serving base station, a handover request message that requests the serving base station to transmit channel information of a handover base station;
   receiving, by the mobile communication terminal from the serving base station, a handover response message including the channel information of the handover base station;
   determining, by the mobile communication terminal, whether the channel information of the handover base station matches the channel information of one of the plural neighbor base stations; and
   selectively updating, by the mobile communication terminal, the channel information of the one of the plural neighbor base stations received via the network management message based on the channel information of the handover base station received via the handover response message if the channel information of the one of the plural neighbor base stations received via the network management message does not match the channel information of the handover base station received via the handover response message.

2. The method according to claim 1, wherein each of the channel information of the one of the plural neighbor base stations and the channel information of the handover base station includes at least one of downlink channel information and uplink channel information.

3. The method according to claim 1, further comprising:
   storing the channel information of the one of the plural neighbor base stations included in the received network management message,
   wherein the step of receiving the network management message includes periodically receiving the network management message.

4. The method according to claim 1, further comprising:
   extracting the channel information of the handover base station from the channel information of the one of the plural neighbor base stations,
   wherein the determining step comprises determining whether the channel information of the handover base station included in the received handover response message matches the extracted channel information of the at least one handover base statation.

5. The method according to claim 1, wherein the determining step comprises:
   determining whether the channel information of the handover base station matches the channel information of the one of the plural neighbor base stations based on a comparison of corresponding identification information for identifying the channel information.

6. A mobile communication terminal for updating channel information in a mobile Internet system, the mobile communication terminal comprising:
   a transceiver configured to
      receive a network management message from a serving base station, the network management message including channel information of plural neighbor base stations,
      transmit a handover request message to the serving base station, the handover request message including a request that the serving base station transmit channel information of a handover base station to the mobile communication terminal, and
      receive a handover response message including the channel information of the handover base station from the serving base station;
   a memory configured to store the received channel information of the plural neighbor base stations; and
   a controller configured to
      determine whether the channel information of the handover base station matches the channel information of one of the plural neighbor base stations, and
      selectively update the stored channel information of the one of the plural neighbor base stations received via the network management message based on the channel information of the handover base station received via the handover response message if the channel information of the one of the plural neighbor base stations received via the network management message does not match the channel information of the handover base station received via the handover response message.

7. The mobile communication terminal according to claim 6, wherein each of the channel information of the one of the plural neighbor base stations and the channel information of the handover base station includes at least one of downlink channel information and uplink channel information.

8. The mobile communication terminal according to claim 6, wherein the transceiver is configured to periodically receive the network management message.

9. The mobile communication terminal according to claim 6, wherein the controller extracts the channel information of the handover base station from the channel information of the one of the plural neighbor base stations stored in the memory, and determines whether the channel information of the handover base station included in the received handover response message matches the extracted channel information of the handover base station.

10. The mobile communication terminal according to claim 6, wherein the controller is configured to determine whether the channel information of the handover base station matches the channel information of the one of the plural neighbor base stations based on a comparison of corresponding identification information for identifying the channel information.

11. A mobile Internet network system for updating channel information, the mobile Internet network system comprising:
  a mobile communication terminal; and
  a serving base station,
  wherein the serving base station is configured to
    collect channel information of plural neighbor base stations,
    receive a handover request message that requests the serving base station to transmit channel information of a handover base station, and
    transmit a handover response message including the channel information of the handover base station to the mobile communication terminal, and
  wherein the mobile communication terminal is configured to
    receive the handover response message including the channel information of the handover base station from the serving base station according to the handover request message,
    determine whether the channel information of the handover base station included in the received handover response message matches the channel information of one of the plural neighbor base stations, and
    selectively update the channel information of the one of the plural neighbor base stations received via the network management message based on the channel information of the handover base station received via the handover response message if the channel information of the one of the plural neighbor base stations received via the network management message does not match the channel information of the handover base station received via the handover response message.

12. A method of updating channel information in a mobile Internet system, the method comprising:
  receiving, by a mobile communication terminal from a serving base station, a network management message including channel information of plural neighbor base stations;
  receiving, by the mobile communication terminal from the serving base station, a handover request message including channel information of a handover base station;
  determining, by the mobile communication terminal, whether the channel information of the handover base station matches the channel information of one of the plural neighbor base stations; and
  selectively updating, by the mobile communication terminal, the channel information of the one of the plural neighbor base stations received via the network management message based on the channel information of the handover base station received via the handover response message if the channel information of the one of the plural neighbor base stations received via the network management message does not match the channel information of the handover base station received via the handover response message.

13. A mobile communication terminal for updating channel information in a mobile Internet system, the mobile communication terminal comprising:
  a transceiver configured to receive from a serving base station
    a network management message including channel information of plural neighbor base stations, and
    a handover request message including channel information of a handover base station;
  a memory configured to store the received channel information of one of the plural neighbor base stations; and
  a controller configured to determine whether the channel information of the handover base station matches the channel information of the one of the plural neighbor base stations, and selectively update the stored channel information of the one of the plural neighbor base stations received via the network management message based on the channel information of the handover base station received via the network management message if the channel information of the one of the plural neighbor base stations received via the network management message does not match the channel information of the handover base station received via the handover response message.

* * * * *